Oct. 30, 1956 W. E. HEDLUND ET AL 2,768,821
ENSILAGE CHIPPER
Filed Jan. 18, 1955 2 Sheets-Sheet 1
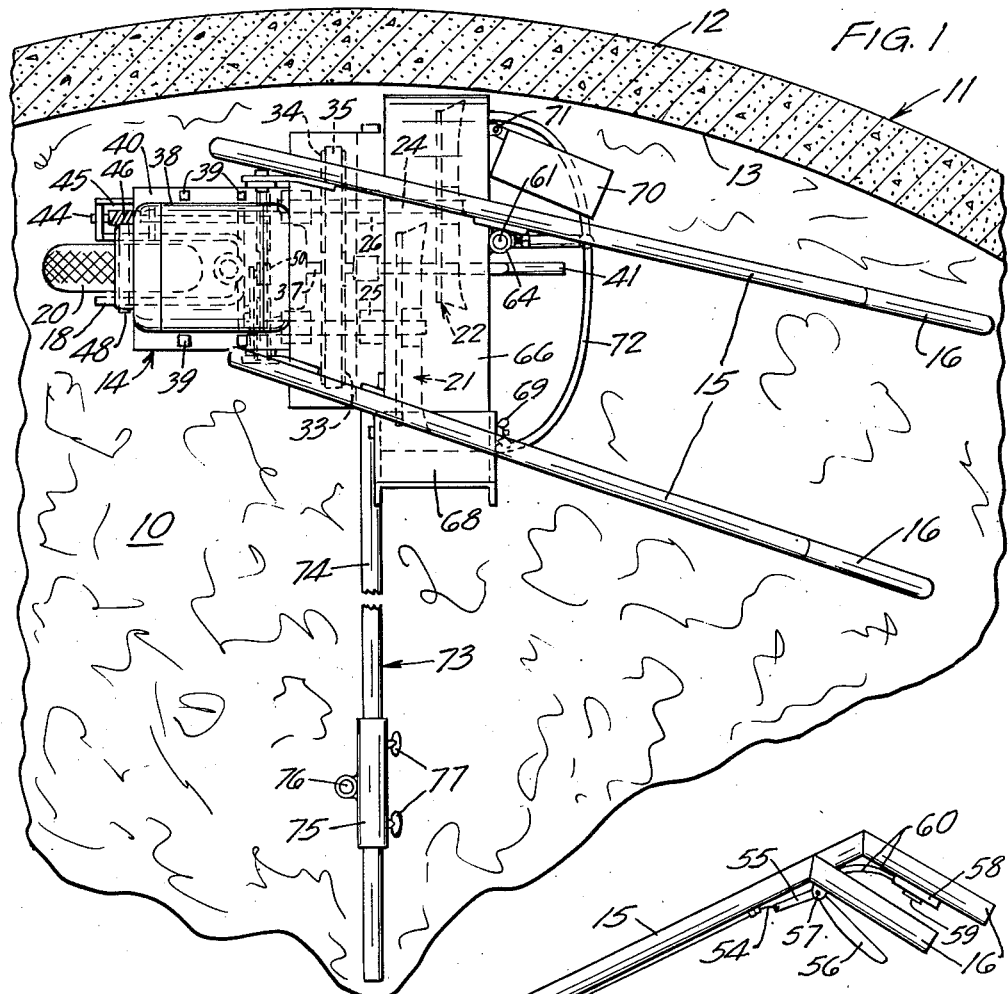
INVENTORS
WILFRED E. HEDLUND
JUNIOR M. HEDLUND
MARTIN R. HEDLUND
BY Williamson, Williamson, Schroeder & Adam
ATTORNEYS Oct. 30, 1956  W. E. HEDLUND ET AL  2,768,821
ENSILAGE CHIPPER
Filed Jan. 18, 1955  2 Sheets-Sheet 2

INVENTORS
WILFRED E. HEDLUND
JUNIOR M. HEDLUND
MARTIN R. HEDLUND
BY Williamson, Williamson, Schroeder & Adams
ATTORNEYS

United States Patent Office 2,768,821
Patented Oct. 30, 1956

2,768,821

ENSILAGE CHIPPER

Wilfred E. Hedlund, Junior M. Hedlund, and Martin R. Hedlund, Boyceville, Wis.

Application January 18, 1955, Serial No. 482,528

3 Claims. (Cl. 262—20)

This invention relates to an ensilage chipper and, more particularly, to a device which will condition ensilage for uniform delivery from a silo during winter months.

Silos of the above-ground type are conventionally round and stand upright for a height usually several times the diameter thereof. The silo is filled with chopped fodder which heats and ferments to a degree during the fall and early winter. The ferment is sufficient to preserve the product without materially affecting its food value. The ensilage is then fed, particularly to cows, by withdrawing periodically small portions from the bottom of the silo for winter diet supplement. Because considerable wall area of the silo is exposed to the atmosphere, the ensilage adjacent the inner wall of the silo will freeze during cold weather and will form a cylindrical icy shell within the silo. If this material is currently mixed with that in unfrozen condition in the center of the silo, no harm will result and full value will be obtained from all of the fodder. However, if the frozen material is allowed to remain in the form of its cylindrical shell, then it must stay in such form until it is chipped loose or until it melts in the spring. Since the frozen material is exposed to air in the hollow shell, it will tend to dry somewhat and may spoil when it is thawed out. If large frozen chunks are chipped loose, then, of course, another problem is presented since considerable time and effort is required to break up the chunks to render them suitable for feeding to animals.

The ideal situation in the case of an upright silo is to intermittently chip loose the outer shell of frozen ensilage and then to mix this material in small pieces with that which is unfrozen in the central portion of the silo. The top surface of all the ensilage may thus be kept substantially level so as to minimize exposure and consequent spoilage from contact with the air. The small frozen chunks mixed with the unfrozen material at the center of the silo is in a condition such that, when delivered to the warmer atmosphere in the barn, it will tend to thaw out and be suitable for feeding after but a short time. The food value is, of course, fully retained when the ideal conditions are carried out.

Obviously, it is difficult to break loose and disintegrate frozen material by hand operation, and it is, therefore, desirable to use some sort of powered device which will directly upon the frozen shell of ensilage in an inner, circumferential pathway within the silo.

It is, therefore, an important object of the invention to provide a device which will effectively chip and break up ensilage peripherally frozen in a silo and which will throw the broken material inwardly to the center of the silo for intermixing with unfrozen ensilage to prevent spoilage and waste of the frozen portion.

It is another object of the invention to provide an ensilage chipper which will quickly and efficiently break up and transfer frozen ensilage by rotary impellers which are designed to work rapidly over the requisite area within the silo.

It is a further object of the invention to provide a frozen ensilage chipper which will be easily and efficiently guided when in operation so as to uniformly break up the frozen material all around the periphery of the silo without danger of digging too deeply or gouging haphazardly into the material.

It is a still further object of the invention to provide an apparatus of the class described which will be self-propelling and will operate smoothly and radially within a circular silo to break up frozen ensilage with a minimum of operative attention from an area directly adjacent the inner wall of the silo to an area more centrally located.

These and other objects and advantages of our invention will more fully appear from the following description, made in connection with the accompanying drawings, wherein like reference characters refer to the same parts throughout the several views and in which:

Figure 1 is a plan view of our ensilage chipper mounted for operation within a silo, the silo being shown segmentally and in horizontal section, and the segmental portion of the radius rod being cut away;

Figure 2 is a side elevation of our chipping apparatus, looking radially outward toward the wall of the silo;

Figure 3:
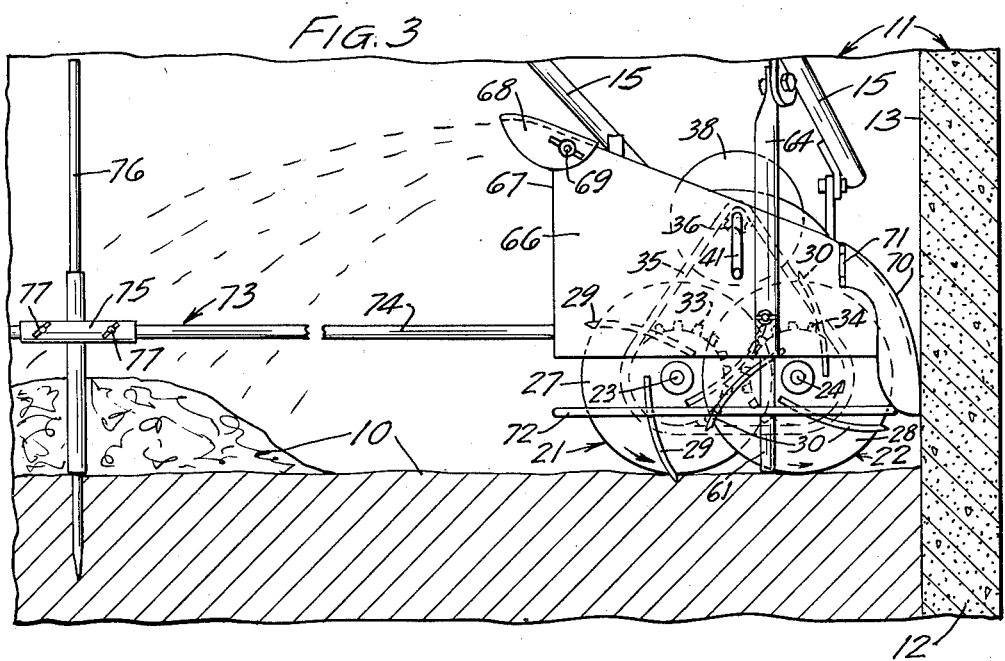
Figure 3 is a front view of our chipping apparatus, certain hidden portions being shown in dotted line and the radius rod having a segmented portion cut away.

With continued reference to the drawings, our apparatus is intended to be used in chipping frozen ensilage indicated generally at 10 which has been stored within a silo 11, the walls of which are circular and upright in the usual cylindrical silo construction. The ensilage 10 will freeze radially inward from the inner surface 13 of walls 12 for a distance of from a few inches up to several feet, depending upon the geographic location and the severity of the winter weather.

Our apparatus comprises generally a supporting frame or structure 14 which terminates upwardly and forwardly in a pair of handles 15 having hand grips 16, as shown in Figures 1 and 2. The frame or supporting structure 14 has a wheel mount 17 with a rearwardly extending fork 18 across which is journalled surface-contacting means such as the wheel 19. It is preferred that the wheel 19 be equipped with a pneumatic rubber tire 20 but such, of course, is not essential to the proper operation of the device. The wheel 19 is mounted in such a manner as to have its plane of rotation substantially in alignment with the longitudinal disposition of the apparatus. The handle elements 15 are angulated inwardly toward the central portion of the silo 11 so as not to interfere with the inner surface 13 during forward travel of the device.

Figure 4:
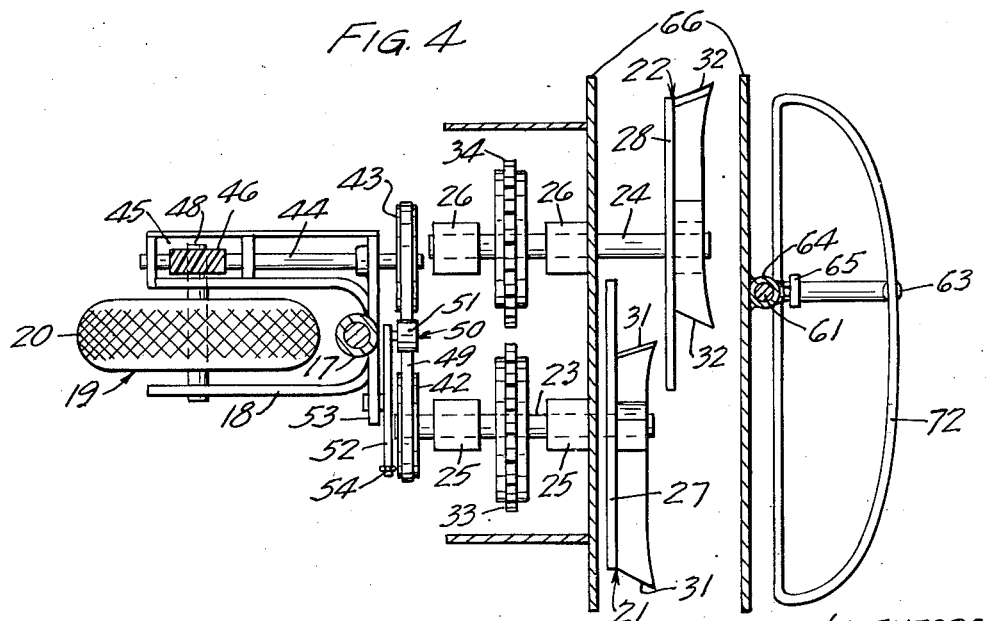
Figure 4 is a top view of the drive mechanism taken in horizontal section on the line 4—4 of Figure 2.

Also journalled to the supporting frame or structure 14 are a pair of rotary cutting and impelling members 21 and 22, respectively, as shown in Figures 1, 2 and 3. The rotary cutting and impelling members are mounted on shafts 23 and 24, respectively, and each of the shafts 23 and 24 are, in turn, journalled in respective pairs of bearings 25 and 26, as shown in Figure 4. The bearings 25 and 26 may be mounted at the underside of the supporting frame 14, as shown in Figure 2. When thus mounted, the shafts 23 and 24 define respective axes for the rotary cutting and impelling members 21 and 22 which lie substantially horizontal and in the general direction of travel of the apparatus. The shafts 23 and 24 are preferably in spaced parallel relation so that the rotary cutting and impelling members 21 and 22 will have a portion of their respective orbital paths in close overlapping relation, as shown.

The rotary cutting and impelling members 21 and 22 constitute a pair of discs 27 and 28, respectively, mounted to the shafts 23 and 24. Each of the discs, in turn, have secured therewith a plurality of blades 29 and 30 on the discs 27 and 28, respectively. The blades 29 are secured to the forwardly facing portion of the discs and extend forwardly for their width and also project radially beyond the outer orbit of each of the discs 27 and 28 so as to form cutting teeth 31 on the blades 29 and cutting teeth 32 on the blades 30.

The shaft 23 has secured rearwardly of the cutting and impelling member 21 a sprocket 33, and the shaft 24 has a similar sprocket 34 secured rearwardly of the corresponding rotary cutting and impelling member 22. Sprockets 33 and 34 are in alignment and driven by a common chain 35 which passes around the sprockets 33 and 34 and also around the motor sprocket 36 which, in turn, is secured to shaft 37 of motor 38. The motor 38 is mounted as by bolts 39 to a mounting platform 40, as shown in Figure 2. The forward end of shaft 37 has secured thereto in axial alignment, a crank 41 which can be manually rotated for a purpose to be later described in the specification.

Rearwardly of and mounted upon shaft 23 is a pulley 42, as shown in Figures 2 and 4. Another pulley 43 is mounted in alignment with pulley 42 and is axially secured to a shaft 44 which is journalled in a gear box 45 secured to one side of the wheel mount 17, as shown in Figure 4. The rearward end of shaft 44 has a worm gear 46 axially secured therewith and in intermeshed engagement with the driven gear 47 which constitutes the axle of drive wheel 19. A flexible belt 49 lies loosely over the pulleys 42 and 43 and may be tightened into driving engagement by means of the belt tightener 50, as shown in Figure 4. The belt tightener 50 has an idler pulley 51 rotatably mounted on arm 52 which, in turn, is pivoted intermediate its ends to a mounting bracket 53, and the latter, in turn, being secured to the wheel mount 17 at the forward end thereof. The pivot arm 52 has a flexible connection such as cable 54 secured to the end of the arm opposite the idler pulley 51 and this flexible cable extends upwardly in guided relation with one of the handle members 15 where it is attached to a bell crank lever, as shown in Figure 2. The bell crank lever has a control grip member 56 and is pivotally mounted at 57 to the hand grip portion 16 so that when the hand grips 16 are grasped and the control grip 56 is depressed inwardly, the idler pulley 51 will tighten the belt 49 and establish driving connection with the wheel 19. A control switch 58 may be mounted on the other hand grip 16 and be provided with a depressible button 59 which will establish electrical contact through leads 60 from a source of electrical power (not shown), and thereby energize motor 38. The switch 58 is so constructed that the control button 59 is constantly urged out of contact and, therefore, constitutes a safety feature in that motor 38 will operate only when the handles 16 are manually grasped and button 59 is depressed.

The forward end of the supporting frame or structure 14 has mounted thereon a depth shoe 61 which terminates in a flat ensilage-constact surface 62 and has a forward up-turned portion 63 which tends to cause the shoe to ride over the surface of ensilage 10. The upper end of shoe 61 is slidably received in a sleeve 64 and may be secured in any predetermined position by such means as thumb nut 65 which is threadably received in sleeve 64 and capable of binding against the upper portion of depth shoe 61, all as shown in Figure 2.

Also constituting a part of the frame or supporting structure 14 is a housing or shield member 66 which overlies the rotary cutting and impelling members 21 and 22 so as to prevent uncontrolled scattering of the ensilage and direct it inwardly toward the center of the silo through a discharge opening 67. The inward terminus of housing 66 may have a U-shaped vane member 68 pivotally mounted by such means as bolt and thumb screw 69 so that the angle of deflection may be varied as desired during the operation of the apparatus. The lower and outermost portion of housing 66 may be provided with a swinging door 70 which is hingedly secured at 71 to one side of housing 66. When it is desired to work very close to the inner wall 13 of the silo wall 12, the hinged door 70 may be swung to the full line position shown in Figure 1 so that the cutting and impelling member 22 can work very close to the wall and without any obstruction. For the sake of safety, when the apparatus is employed at other radial distances inward from the outermost position, then the door 70 is closed so as to completely guard and encase the rotary cutting and impelling members. A further safety factor resides in a guardrail 72 which is mounted forwardly of the housing 66 on frame 14 and extends outwardly of the crank 41 to assist against accidental encountering by any part of an operator's body during the energization of motor 38.

Guiding means 73 may be provided so as to maintain the entire apparatus at proper radial distance from the center of the silo. The guiding means constitutes a removable radius rod 74 which extends horizontally inward and is received within a sleeve member 75 adjacent its inner end. The sleeve 75, in turn, is secured as by welding to a pivot post 76 which may be pushed or driven into the ensilage at substantially the center of the silo. Fastening members such as thumb nuts 77 may be employed to adjust the radial length of the radius rod 74 to cause the apparatus to swing about the silo in a curved path concentric with the general wall structure 12 of the silo 11.

In the use and operation of our ensilage chipper, the leads 60 of the motor 38 are secured to a suitable source of electric energy (not shown) and pivot post 76 is driven vertically into the surface of the ensilage 10 radius rod 74 is then secured relative to the pivot post 76 by means of thumb nuts 77 so as to define the radial path of the apparatus during operation. The operator then grasps the hand grips 16 of handle elements 15 and depresses the switch button 59 to energize the motor 38. The rotary cutting and impelling members 21 and 22 will then rotate in the same direction with the lower portion of their orbits digging and chipping for a predetermined distance into the surface of the ensilage by virtue of contact therewith by the toothed ends 31 and 32 of blades 29 and 30, respectively. The depth of the cut is, of course, predetermined by adjustment of depth shoe 61, which adjustment is maintained at the desired depth by means of thumb nut 65. We have found that the particular speed and ease of chipping which we acquire is due to the dual arrangement of the rotary cutting and impelling members. A single rotor to accomplish the same purpose would, necessarily, have such a great diameter as to render the apparatus impractical if it were desired to cut the same swath of material. Furthermore, the dual arrangement of cutting and impelling members requires a lesser depth of operation to achieve a faster removal of the frozen ensilage and thereby minimizes the opportunity for gouging and stalling of the driving mechanism during operation. Since the disc portions of the cutting and impelling members overlap to a considerable degree, the individual cutting paths will also overlap and form a ridge between the cutting and impelling members as the apparatus progresses circularly about the silo. If the cut is continued in the same path, the frozen ensilage will continue to be removed but the ridge will not increase in height. If desired, several complete revolutions around the silo wall may be made before re-adjusting the position of radius rod 74. The progressive inward adjustment of radius rod 74 will thus cause substantially all of the frozen outer shell of ensilage to be chipped and projected toward the center of the silo from which it may be removed or brought back to the new level of the frozen ensilage by removal in increments as required from the bottom of the silo. It is understood, of course, that the operation is easier if the top level of the ensilage is maintained as close to horizontal as possible.

During the operation of the device, the drive wheel 19 is intended to furnish all or most of the motivating force while the operator merely guides or slightly assists in the operation by pulling the handles 15 in a forward direction.

As before noted, both the switch button 59 and the belt tightener grip 56 must be depressed in order to operate the equipment, and should the operator lose his balance or otherwise fail to properly control the apparatus, the entire device will immediately cease operating.

As an aid to re-adjusting the radial position of the apparatus, the thumb nuts 77 may be loosened and the crank 41 manually rotated to the left or the right to cause the rotary cutting and impelling members 21 and 22 to ride laterally upon the frozen surface of the ensilage. In such case, the outer periphery of the cutting and impelling members will, of course, ride upon the top of the frozen ensilage and wheel tire 20 and depth shoe 61 will merely skid laterally over the surface until the new radial position is attained.

It may thus be seen that we have devised a simple and efficient apparatus for rapidly and systematically disintegrating the frozen shell of ensilage within a silo so as to eliminate waste of food during the winter months. The device, although in itself having such strength and weight as to properly perform the chipping operation, is nevertheless operated very easily to achieve the foregoing disintegration of frozen ensilage.

It will, of course, be understood that various changes may be made in the form, details, arrangement and proportions of the parts without departing from the scope of our invention.

What is claimed is:

1. A chipper for peripherally frozen ensilage in an upright cylindrical silo comprising, a supporting frame, a radius arm secured to said supporting frame, a pivot post secured to said radius arm in adjustable spaced relation with said supporting frame for location substantially at the center in the surface of said ensilage in a silo, surface-contacting means secured at a lower position on the supporting frame and permitting travel of the chipper radially with respect to said pivot post over the surface of the ensilage, a pair of rotary cutting and impelling members journalled on said supporting frame and having their respective axes lying substantially horizontal and in the general direction of travel, the outer orbits of said cutting and impelling members transversely intersecting to a controlled degree the surface of the ensilage, a power-driven mechanism secured to said supporting frame and operably connected to rotate said cutting and impelling members, and a shield overlying both of the rotary cutting and impelling members and terminating radially in the direction of said post in a deflecting vane, whereby frozen ensilage adjacent the inner walls of a silo wall will be broken and chipped and then impelled toward the vertical center of the silo.

2. In apparatus for peripherally chipping frozen ensilage in an upright cylindrical silo, a supporting structure having an outer side adapted to face the inner wall of the silo and an inner side facing the vertical center of the cylindrical silo, a driving wheel rotatably journalled on the supporting structure for travelling circumferentially in contact with the surface of peripherally frozen ensilage, a pair of rotary cutting and impelling members journalled on said supporting structure and having their respective axes lying substantially horizontal and in the general direction of travel, the outer orbits of said cutting and impelling members transversely intersecting to a predetermined depth the surface of the ensilage, a power-driven mechanism secured to said supporting structure and operably connected to rotate said cutting and impelling members in the same direction and operably connected with the driving wheel for pushing the apparatus in its travel, a shield overlying both of the rotary cutting and impelling members and terminating in a deflecting vane directed toward the vertical center of the silo in use, and means secured to the supporting structure and adapted to be anchored substantially centrally of the surface of the ensilage to guide said apparatus in a curved path adjacent the inner wall of the silo whereby frozen ensilage will be broken and chipped and then impelled toward the vertical center of the silo.

3. A chipper for peripherally frozen ensilage in an upright cylindrical silo comprising, a supporting frame, a radius arm secured to said supporting frame, a pivot post secured to said radius arm in adjustable spaced relation with said supporting frame for location substantially at the center in the surface of said ensilage in a silo, surface-contacting means secured at a lower position on the supporting frame and permitting travel of the chipper radially with respect to said pivot post over the surface of the ensilage, a pair of rotary cutting and impelling members journalled on said supporting frame and having their respective axes lying substantially horizontal and in the general direction of travel, the lower orbits of said cutting and impelling members lying in overlapped relation and transversely intersecting to a controlled degree the surface of the ensilage, a power-driven mechanism secured to said supporting frame and operably connected to rotate said cutting and impelling members in the same direction, rotation at the lower orbit being away from said pivot post and rotation at the upper orbit being toward said post, and a shield overlying both of the rotary cutting and impelling members and terminating radially in the direction of said pivot post in a deflecting vane, whereby frozen ensilage adjacent the inner walls of a silo wall will be broken and chipped and then impelled toward the vertical center of the silo.

References Cited in the file of this patent

UNITED STATES PATENTS

| | | |
|---|---|---|
| 1,691,809 | Huenefeld et al. | Nov. 13, 1928 |
| 1,881,865 | Neal | Oct. 11, 1932 |
| 2,634,962 | Eglitis | Apr. 14, 1953 |